(12) United States Patent
Prasad et al.

(10) Patent No.: US 10,387,306 B2
(45) Date of Patent: Aug. 20, 2019

(54) SYSTEMS AND METHODS FOR PROGNOSTICATING LIKELIHOOD OF SUCCESSFUL SAVE OPERATION IN PERSISTENT MEMORY

(71) Applicant: Dell Products L.P., Round Rock, TX (US)

(72) Inventors: Parmeshwr Prasad, Bengaluru (IN); Yogesh P. Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 15/640,020

(22) Filed: Jun. 30, 2017

(65) Prior Publication Data
US 2019/0004948 A1    Jan. 3, 2019

(51) Int. Cl.
*G06F 12/0804*    (2016.01)
*G06F 3/06*    (2006.01)

(52) U.S. Cl.
CPC ........ *G06F 12/0804* (2013.01); *G06F 3/0619* (2013.01); *G06F 3/0647* (2013.01); *G06F 3/0685* (2013.01); *G06F 2212/1032* (2013.01); *G06F 2212/205* (2013.01)

(58) Field of Classification Search
CPC ............. G06F 9/44505; G06F 12/0804; G06F 2212/1032; G06F 2212/205; G06F 3/0619; G06F 3/0647; G06F 3/0685
See application file for complete search history.

(56) References Cited

U.S. PATENT DOCUMENTS

| | | | |
|---|---|---|---|
| 2010/0205348 A1* | 8/2010 | Moshayedi | G11C 5/14 711/102 |
| 2011/0016260 A1* | 1/2011 | Lomelino | G06F 11/1441 711/103 |
| 2015/0279463 A1* | 10/2015 | Berke | G11C 5/04 711/105 |
| 2017/0052716 A1 | 2/2017 | Jenne et al. | |
| 2018/0246643 A1 | 8/2018 | Jenne et al. | |
| 2018/0246647 A1 | 8/2018 | Sankaranarayanan et al. | |
| 2019/0012101 A1* | 1/2019 | Jenne | G06F 3/0619 |
| 2019/0012263 A1* | 1/2019 | Jenne | G06F 12/0804 |

* cited by examiner

*Primary Examiner* — Zhuo H Li
(74) *Attorney, Agent, or Firm* — Jackson Walker L.L.P.

(57) ABSTRACT

In accordance with embodiments of the present disclosure, an information handling system may include a processor, a prognostic agent embodied in a program of executable instructions and configured to, when executed, maintain a prognostic data structure setting forth a plurality of parameters regarding a non-volatile memory of the information handling system, and a memory controller configured. The memory controller may be configured to calculate a severity index based on the parameters set forth in the prognostic data structure, the severity index indicative of a likelihood of successfully completing a save operation to the non-volatile memory from a volatile memory in response to a power event of the information handling system and based on the severity index, determine whether or not to perform a save operating in response to a power event of the information handling system.

19 Claims, 2 Drawing Sheets

SYSTEMS AND METHODS FOR PROGNOSTICATING LIKELIHOOD OF SUCCESSFUL SAVE OPERATION IN PERSISTENT MEMORY

TECHNICAL FIELD

The present disclosure relates in general to information handling systems, and more particularly to systems and methods for prognosticating a likelihood of a successful save operation in a persistent memory of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. To enable such functionality, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a "save" operation to transfer data from the DRAM to the flash memory in response to a power loss event from the power supply unit.

NVDIMMs may require tens of seconds to minutes of time to copy from DRAM memory to flash memory. Such time may vary with NVDIMM capacity, organization, supplier, error correction code modes, encryption settings, or state-of-wear leveling. Successful data movement between DRAM memory and flash memory may not be guaranteed in all cases. Accordingly, an indication of a likelihood of a successful save operation may be desired.

SUMMARY

In accordance with the teachings of the present disclosure, the disadvantages and problems associated with existing approaches to performing save operations to a persistent memory of an information handling system may be reduced or eliminated.

In accordance with embodiments of the present disclosure, an information handling system may include a processor, a prognostic agent embodied in a program of executable instructions and configured to, when executed, maintain a prognostic data structure setting forth a plurality of parameters regarding a non-volatile memory of the information handling system, and a memory controller configured. The memory controller may be configured to calculate a severity index based on the parameters set forth in the prognostic data structure, the severity index indicative of a likelihood of successfully completing a save operation to the non-volatile memory from a volatile memory in response to a power event of the information handling system and based on the severity index, determine whether or not to perform a save operating in response to a power event of the information handling system.

In accordance with these and other embodiments of the present disclosure. A method may include maintaining a prognostic data structure setting forth a plurality of parameters regarding a non-volatile memory of the information handling system, calculating a severity index based on the parameters set forth in the prognostic data structure, the severity index indicative of a likelihood of successfully completing a save operation to the non-volatile memory from a volatile memory in response to a power event of the information handling system, and based on the severity index, determining whether or not to perform a save operating in response to a power event of the information handling system.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, during boot of an information handling system, maintain a prognostic data structure setting forth a plurality of parameters regarding a non-volatile memory of the information handling system, calculate a severity index based on the parameters set forth in the prognostic data structure, the severity index indicative of a likelihood of successfully completing a save operation to the non-volatile memory from a volatile memory in response to a power event of the information handling system, and based on the severity index, determine whether or not to perform a save operating in response to a power event of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
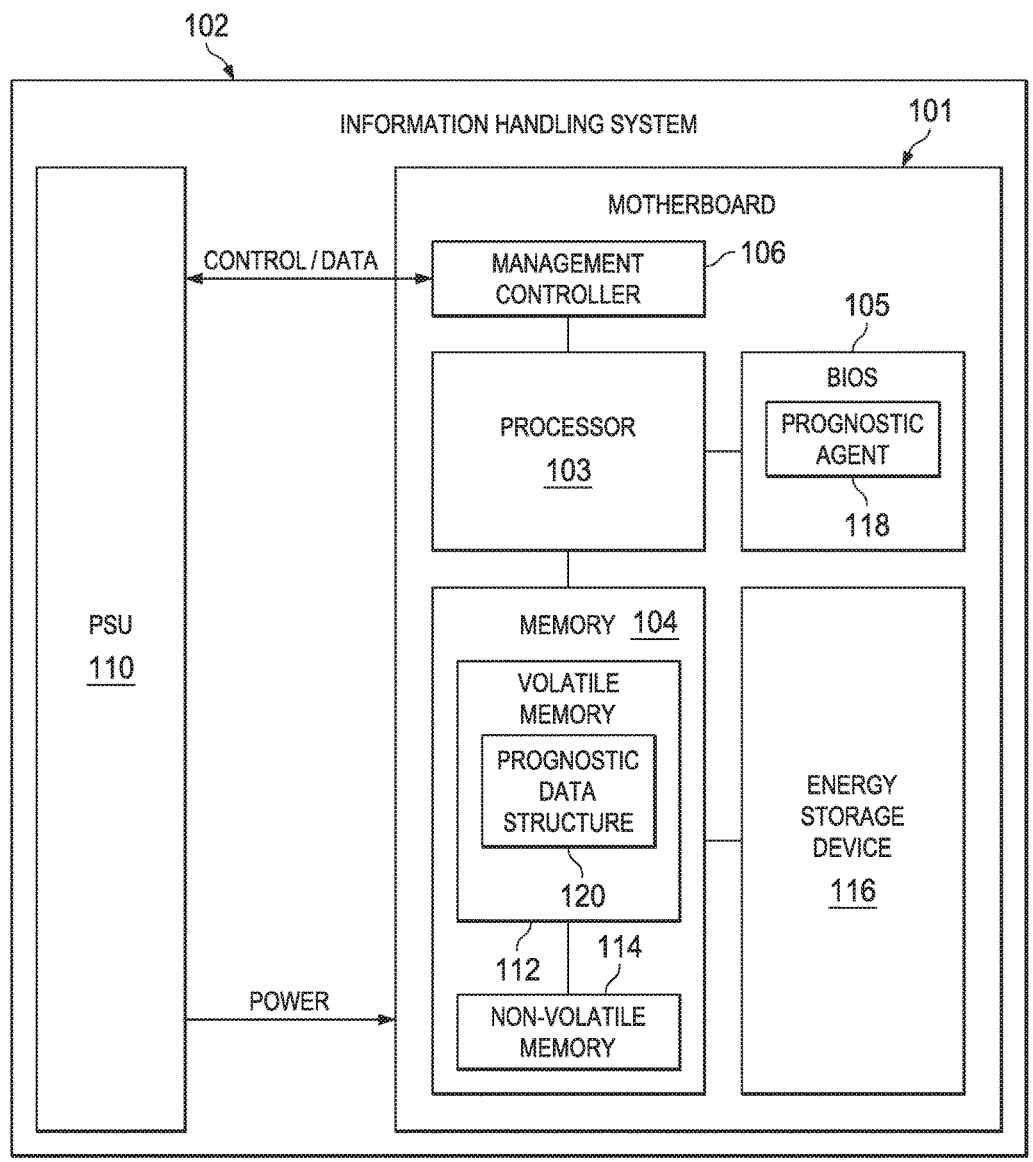
FIG. 1 illustrates a block diagram of an example information handling system, in accordance with embodiments of the present disclosure.
Figure 2:
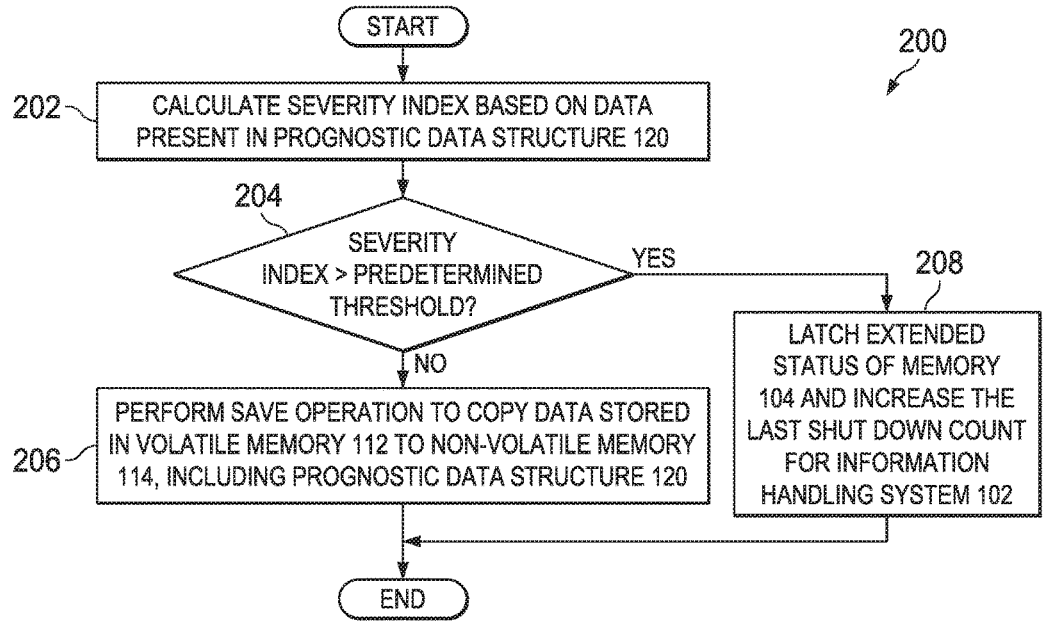
FIG. 2 illustrates a flow chart of an example method for prognosticating likelihood of a successful save operation in response to a power event, in accordance with embodiments of the present disclosure.
Figure 3:
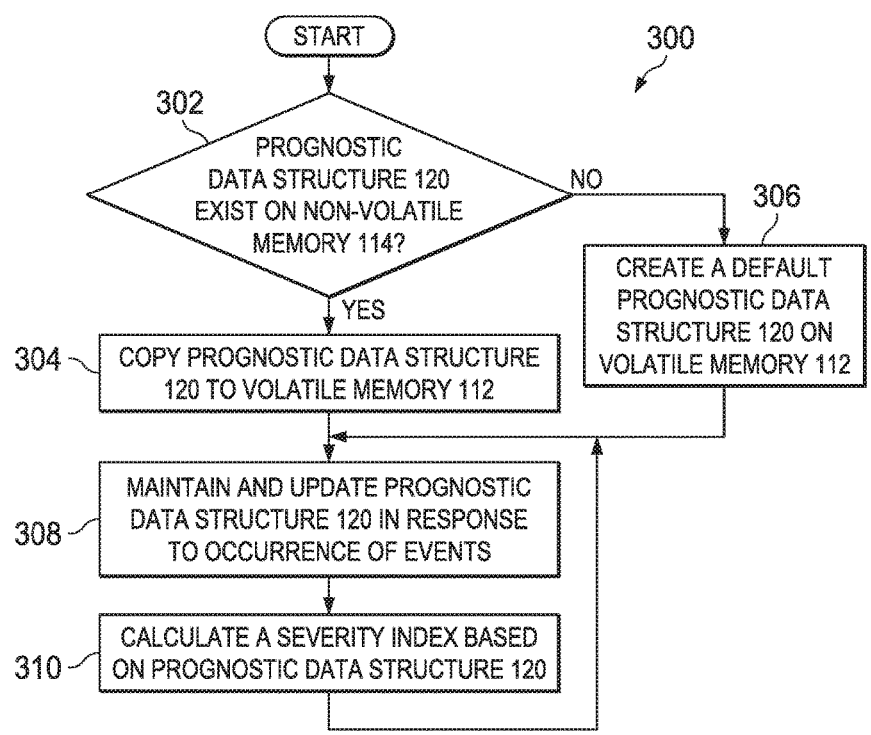
FIG. 3 illustrates a flow chart of an example method for creating and maintaining a prognostic data structure, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, an energy storage device 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a persistent memory (e.g., comprising one or more NVDIMMs) that includes a volatile memory 112 (e.g., DRAM or other volatile random-access memory) and non-volatile memory 114 (e.g., flash memory or other non-volatile memory). During normal operation, when PSU 110 provides adequate power to components of information handling system 102, data written to memory 104 from processor 103 may be stored in volatile memory 112. However, in the event of loss of system input power or a power fault of PSU 110 that prevents delivery of electrical energy from PSU 110 to memory 104, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allow the data to remain persistent through a power disruption. Accordingly, although not explicitly shown in FIG. 1, memory 104 may also include hardware, firmware, and/or software for carrying out save operations.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to, alone or in concert with management controller 106, perform timing characterization for save operations in memory 104, as described in greater detail below.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110. In some embodiments, management controller 106 may also be configured to, alone or in concert with BIOS 105, perform timing characterization for save operations in memory 104, as described in greater detail below.

Generally speaking, PSU 110 may include any system, device, or apparatus configured to supply electrical current to one or more information handling resources of information handling system 102.

Energy storage device 116 may comprise any system, device, or apparatus configured to store energy which may be used by memory 104 to perform save operations in response to a loss of system input power source (e.g., alternating current input source) or power fault of PSU 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). In yet other embodiments, energy storage device 116 may comprise a power supply external to memory 104. Although energy storage device 116 is shown in FIG. 1 as external to memory 104, in some embodiments energy storage device 116 may be integral to memory 104. In these and other embodiments, energy storage device 116 may be charged from PSU 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memory 104 devices.

In addition to motherboard 101, processor 103, memory 104, BIOS 105, management controller 106, energy storage device 116, and PSU 110, information handling system 102 may include one or more other information handling resources. For example, in some embodiments, information handling system 102 may include more than one PSU 110 and/or more than one energy storage device 116.

In operation, BIOS 105 (or another component of information handling system 102) may be configured to execute an automated prognostic agent that maintains a prognostic data structure 120 that may be used by BIOS 105 and/or memory 104 to prognosticate or predict the likelihood of a successful save operation in the event of a power loss from PSU 110. Prognostic data structure 120 may include a map, table, matrix, list, database, or any other suitable data structure. For example, in some embodiments, prognostic data structure 120 may be implemented as a radix tree. During runtime, prognostic agent 118 may maintain prognostic data structure 120 in a predefined memory location within volatile memory 112, transfer prognostic data structure 120 to non-volatile memory 114 during a save operation, and transfer data structure 120 from non-volatile memory 114 to volatile memory 112 in a restore operation following a save operation.

Prognostic data structure 120 may store a plurality of parameters and values that may be used to calculate a "severity index" which is indicative of a likelihood of a save operation completing successfully in response to a power fault of PSU 110. Among the parameters and values that may be stored in prognostic data structure 120 are legacy information, non-volatile memory information, and real-time events information. Legacy information may include, without limitation, information related to a motherboard configuration, NVDIMM topology, hardware manufacturer, device identifier, vendor identifier, and/or other suitable information.

Non-volatile memory information may include, without limitation, a number of spare non-volatile memory labels, a last shutdown status of non-volatile memory 114, a number of times BIOS 105 or an operating system was unable to create, delete, or modify namespaces of non-volatile memory 114, a last shutdown count, a number of increasing bad blocks of non-volatile memory 114, etc.

Real-time events information may include, without limitation, a temperature, a charge level of energy storage device 116, and a percentage of data available on a durability domain (e.g., area of non-volatile memory 114 which is guaranteed to save).

Prognostic agent 118 or a controller of memory 104 may use the information maintained in prognostic data structure 120 to calculate a severity index SI which may be given by:

$$SI = p_1 L_1 n_1 + p_1 N_1 n_1 + p_1 R_1 n_1 + \ldots p_z L_z n_z + p_z N_z n_z + p_z R_z n_z$$

Where pi equals a numerical priority assigned to an event, $L_i$ is a value assigned to a legacy parameter, $N_i$ is a value assigned to a non-volatile memory parameter, $R_i$ is a value assigned to a real-time parameter, and i varies from 1 to z, where z is the number of times an event related to a particular parameter occurs.

During a boot, prognostic agent 118 may migrate prognostic data structure 120 from non-volatile memory 114 to volatile memory 112, such that prognostic data structure 120 represents a last state of non-volatile memory 114. During runtime, prognostic agent 118 may trigger automatic capture of events and update values stored in prognostic data structure 120 based on events occurring during runtime.

In the event of power loss, restore, or hot-add of memory, prognostic agent 118, memory 104, and/or other components of information handling system 102 may operate as set forth below with reference to methods 200 and 300.

FIG. 2 illustrates a flow chart of an example method 200 for prognosticating likelihood of a successful save operation in response to a power event, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, in response to a controller of memory 104 sensing an absence of electrical energy being provided from PSU 110, the controller may, based on data present in prognostic data structure 120, calculate a severity index. At step 204, the controller may determine if the severity index is above a predetermined threshold. If the severity index is above the predetermined threshold, method 200 may proceed to step 208. Otherwise, if the severity index is below the predetermined threshold, method 200 may proceed to step 206.

At step 206, in response to the severity index being below the predetermined threshold, the controller may perform a save operation to copy data stored in volatile memory 112 to non-volatile memory 114, including prognostic data structure 120. After completion of step 206, method 200 may end.

At step 208, in response to the severity index being above the predetermined threshold, the controller may latch an extended status of memory 104 and increase the last shut down count for information handling system 102, which data may be used by an administrator to take future action. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for creating and maintaining a prognostic data structure, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, in response to a powering on of information handling system 102 and a determination that the prognostication features disclosed herein are enabled on information handling system 102, prognostic agent 118 may determine whether prognostic data structure 120 exists on non-volatile memory 114. If prognostic data structure 120 exists on non-volatile memory 114, method 300 may proceed to step 304. Otherwise, if prognostic data structure 120 does not exist on non-volatile memory 114, method 300 may proceed to step 306.

At step 304, in response to prognostic data structure 120 existing on non-volatile memory 114, prognostic agent 118 may copy prognostic data structure 120 to volatile memory 112. After completion of step 304, method 300 may proceed to step 308.

At step 306, in response to prognostic data structure 120 not existing on non-volatile memory 114, prognostic agent 118 may create a default prognostic data structure 120 on volatile memory 112.

At step 308, prognostic agent 118 may maintain and update prognostic data structure 120 in response to occurrence of events (e.g., legacy events, non-volatile memory events, real-time events). At step 310, prognostic agent 118 may from time to time calculate a severity index based on prognostic data structure 120. After completion of step 310, method 300 may proceed again to step 308.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Although method 300 is discussed above in reference to a start-up or powering on, it is understood that a method similar or identical to method 300 may be utilized in response to a hot add of memory modules to memory 104 during runtime.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
a prognostic agent embodied in a program of executable instructions and configured to, when executed, maintain a prognostic data structure setting forth a plurality of parameters regarding a non-volatile memory of the information handling system; and
a memory controller configured to:
calculate a severity index based on the parameters set forth in the prognostic data structure, the severity index indicative of a likelihood of successfully completing a save operation to the non-volatile memory from a volatile memory in response to a power event of the information handling system; and
based on the severity index, determine whether or not to perform a save operation in response to a power event of the information handling system;
wherein the parameters include:
legacy information including information related to a configuration of the information handling system, a topology of the non-volatile memory, a hardware manufacturer, a device identifier, and/or a vendor identifier; and
non-volatile memory information including information related to a number of spare non-volatile memory labels, a last shutdown status of the non-volatile memory, a number of times the information handling system was unable to create, delete, or modify namespaces of the non-volatile memory, a last shutdown count, and/or a number of increasing bad blocks of the non-volatile memory.

2. The information handling system of claim 1, wherein the prognostic agent is embodied in a basic input/output system of the information handling system.

3. The information handling system of claim 1, wherein the non-volatile memory comprises a non-volatile dual inline memory module.

4. The information handling system of claim 1, wherein the volatile memory comprises a dynamic random access memory.

5. The information handling system of claim 1, wherein the legacy information includes the topology of the non-volatile memory.

6. The information handling system of claim 1, wherein the non-volatile memory information includes the number of times the information handling system was unable to create, delete, or modify namespaces of the non-volatile memory.

7. The information handling system of claim 1, wherein the parameters further include information regarding real-time events of the information handling system.

8. A method comprising:
maintaining a prognostic data structure setting forth a plurality of parameters regarding a non-volatile memory of an information handling system;
calculating a severity index based on the parameters set forth in the prognostic data structure, the severity index indicative of a likelihood of successfully completing a save operation to the non-volatile memory from a volatile memory in response to a power event of the information handling system; and
based on the severity index, determining whether or not to perform a save operation in response to a power event of the information handling system;
wherein the parameters include:
legacy information including information related to a configuration of the information handling system, a topology of the non-volatile memory, a hardware manufacturer, a device identifier, and/or a vendor identifier; and
non-volatile memory information including information related to a number of spare non-volatile memory labels, a last shutdown status of the non-volatile memory, a number of times the information handling system was unable to create, delete, or modify namespaces of the non-volatile memory, a last shutdown count, and/or a number of increasing bad blocks of the non-volatile memory.

9. The method of claim 8, wherein the non-volatile memory comprises a non-volatile dual inline memory module.

10. The method of claim 8, wherein the volatile memory comprises a dynamic random access memory.

11. The method of claim 8, wherein the legacy information includes the topology of the non-volatile memory.

12. The method of claim 8, wherein the non-volatile memory information includes the number of times the information handling system was unable to create, delete, or modify namespaces of the non-volatile memory.

13. The method of claim 8, wherein the parameters further include information regarding real-time events of the information handling system.

14. An article of manufacture comprising:
a non-transitory computer-readable medium; and
computer-executable instructions carried on the computer-readable medium, the instructions readable by a processor, the instructions, when read and executed, for causing the processor to, during boot of an information handling system:
maintain a prognostic data structure setting forth a plurality of parameters regarding a non-volatile memory of the information handling system;
calculate a severity index based on the parameters set forth in the prognostic data structure, the severity index indicative of a likelihood of successfully completing a save operation to the non-volatile memory from a volatile memory in response to a power event of the information handling system; and
based on the severity index, determine whether or not to perform a save operation in response to a power event of the information handling system;
wherein the parameters include:
legacy information including information related to a configuration of the information handling system, a topology of the non-volatile memory, a hardware manufacturer, a device identifier, and/or a vendor identifier; and
non-volatile memory information including information related to a number of spare non-volatile memory labels, a last shutdown status of the non-volatile memory, a number of times the information handling system was unable to create, delete, or modify namespaces of the non-volatile memory, a last shutdown count, and/or a number of increasing bad blocks of the non-volatile memory.

15. The article of claim 14, wherein the non-volatile memory comprises a non-volatile dual inline memory module.

16. The article of claim 14, wherein the volatile memory comprises a dynamic random access memory.

17. The article of claim 14, wherein the legacy information includes the topology of the non-volatile memory.

18. The article of claim 14, wherein the non-volatile memory information includes the number of times the information handling system was unable to create, delete, or modify namespaces of the non-volatile memory.

19. The article of claim 14, wherein the parameters further include information regarding real-time events of the information handling system.

* * * * *